United States Patent [19]

Yamada et al.

[11] Patent Number: 4,841,503
[45] Date of Patent: Jun. 20, 1989

[54] SYSTEM FOR RECORDING INFORMATION FROM ONE RECORDING MEDIUM ONTO A REVERSING CASSETTE TAPE RECORDING MEDIUM WITHOUT LOSS OF INFORMATION DURING A REVERSING OPERATION

[75] Inventors: Jiro Yamada, Neyagawa; Masahide Haseoka, Kadoma; Isao Obata, Nara, all of Japan

[73] Assignee: Matsushita Electric Industrial Co., Ltd., Osaka, Japan

[21] Appl. No.: 84,460

[22] Filed: Aug. 12, 1987

[30] Foreign Application Priority Data

Aug. 18, 1986 [JP] Japan ................... 61-192353

[51] Int. Cl.⁴ .................... G11B 5/86; G11B 13/04
[52] U.S. Cl. ........................ 369/14; 360/15; 360/74.1; 369/85
[58] Field of Search ........... 369/14, 84, 85, 32, 369/275; 360/15, 74.1, 74.2, 74.3, 74.4

[56] References Cited

U.S. PATENT DOCUMENTS

| | | | |
|---|---|---|---|
| 3,906,169 | 9/1975 | Iwase et al. ................ | 369/85 |
| 4,367,500 | 1/1983 | Furuta et al. .............. | 360/72.3 |
| 4,471,390 | 9/1984 | Hamann . | |
| 4,550,350 | 10/1985 | Billings . | |
| 4,614,983 | 9/1986 | Usami ...................... | 369/14 |
| 4,701,814 | 10/1987 | Westall ..................... | 360/72.3 |
| 4,734,792 | 3/1988 | Maeda et al. .............. | 360/14.2 |

FOREIGN PATENT DOCUMENTS

| | | | |
|---|---|---|---|
| 1449383 | 8/1970 | Fed. Rep. of Germany . | |
| 59-198535 | 11/1984 | Japan ....................... | 360/15 |
| 61-29458 | 2/1986 | Japan ....................... | 369/85 |
| 63-13484 | 1/1988 | Japan . | |

Primary Examiner—Alan Faber
Assistant Examiner—Hoa T. Nguyen
Attorney, Agent, or Firm—Stevens, Davis, Miller & Mosher

[57] ABSTRACT

The present invention intends to record the information which was divisionally recorded on a disk onto a recording medium without a loss of information. The operation of a disk reproducing apparatus for reproducing the information recorded on the disk and the operation of a recording apparatus for recording the information reproduced by the disk reproducing apparatus are synchronously started. When the recording medium of the recording apparatus has reached an end, the reproducing operation of the disk reproducing apparatus is immediately stopped. The header signal of the music divisionally recorded on the disk is searched for by a searching means of the disk reproducing apparatus. The reproducing operation is temporarily stopped. After the recording medium is reversed, the reproduction of the disk reproducing apparatus is restarted from the searched for header signal.

3 Claims, 4 Drawing Sheets

SYSTEM FOR RECORDING INFORMATION FROM ONE RECORDING MEDIUM ONTO A REVERSING CASSETTE TAPE RECORDING MEDIUM WITHOUT LOSS OF INFORMATION DURING A REVERSING OPERATION

BACKGROUND OF THE INVENTION

The present invention relates to an information reproducing and recording system in which reproduced disk information is reproduced and recorded onto another medium.

A known information reproducing and recording system of this type shown in FIG. 5. Reference numeral 51 denotes a reproduction start command means; 52 is a disk reproducing apparatus to start the reproduction of a disk type information recording medium (hereinafter, simply referred to as a disk) by a reproduction start command of the reproduction start command means 51; 53 denotes a recording start command means for outputting a recording start command so as to make a recording an another recording medium, which will be explained hereinafter, operative by a command of the reproduction start command means 51 synchronously with the reproducing operation of the disk reproducing apparatus 52; and 54 represents a recording apparatus for another recording medium which operates by the recording start command of the recording start command means 53 and records the information reproduced by the disk reproducing apparatus 52.

The foregoing conventional system operates in the following manner. When the user operates the reproduction start command means 51 and starts the reproduction of the disk by making the disk reproducing apparatus 52 operative, a command is outputted from the reproduction start command means 51 to the recording start command means 53, so that the recording apparatus 54, for example a cassette recorder, or the like, operates. The recording apparatus 54 records the information reproduced by the disk reproducing apparatus 52.

However, the foregoing conventional information reproducing and recording system has the following problems. Namely, if the end of tape of the recording apparatus 54 is reached while the recording apparatus 54 such as, e.g., cassette tape recorder or the like is recording the information reproduced by the disk reproducing apparatus 52, the disk reproducing apparatus 52 continues the reproduction of the disk irrespective of the state of the recording apparatus 54. This problem also exists, even when using an automatic reversing type recording apparatus, for recording apparatus 54. In an auto-reversing type cassette tape recorder in which when the end of tape is reached during the recording on the first side of the tape, the magnetic head is automatically reversed and at the same time, the running direction of the tape is changed to thereby record onto the second side of the tape, if the tape end is reached, the disk reproducing apparatus 52 continues the reproduction irrespective of the state of the recording apparatus 54. Therefore, the information reproduced by the disk reproducing apparatus 52 is not recorded by the recording apparatus 54 for the period of time when the magnetic head of the recording apparatus 54 is reversed, so that the discontinuous and incomplete information is recorded on the tape.

SUMMARY OF THE INVENTION

The present invention has been designed to solve the foregoing conventional problems and it is an object of the invention to provide an information reproducing and recording system which can continuously record by a recording apparatus without losing information reproduced by a disk reproducing apparatus.

To solve the foregoing conventional problems, an information reproducing and recording system of the invention comprises: a disk reproducing apparatus for reproducing information from a plurality of information sections (containing music or the like) recorded on a disk; a recording apparatus for recording the information reproduced by the disk reproducing apparatus onto a recording medium; operation start command means for starting the operations of the disk reproducing apparatus and recording apparatus synchronously with each other; detecting means for detecting that the recording medium of the recording apparatus has reached the end; searching means for receiving an output of the detecting means and interrupting the information reproducing operation of the disk reproducing apparatus and searching for the header signal of the interrupted information section (searching for the header signal of the music which is being reproduced) at the time of interruption; pause command means for temporarily stopping the disc reproducing apparatus in response to the completion of the header signal search of the searching means; and reversing means for receiving the output of the detecting means and reversing the driving direction of the recording medium, wherein the temporary stop state of the disk reproducing apparatus is released after the recording medium is reversed by the reversing means.

The invention by the above-mentioned means operates in the following manner. If the recording medium of the recording apparatus has reached the end while the disk reproducing apparatus is reproducing the information on the disk, the header signal of an information section which is being reproduced by the disk reproducing apparatus is searched and thereafter, the reproduction is temporarily stopped. After the recording medium is reversed, the temporary stop state is released and the recording is restarted from the header signal of the information section in which the reproduction of information was interrupted at the end of the recording medium. In this manner, the information on the disk is recorded onto the recording medium without lost information.

DESCRIPTION OF PREFERRED EMBODIMENT

An embodiment of the present invention will be described hereinbelow with reference to the drawings.

Figure 1:
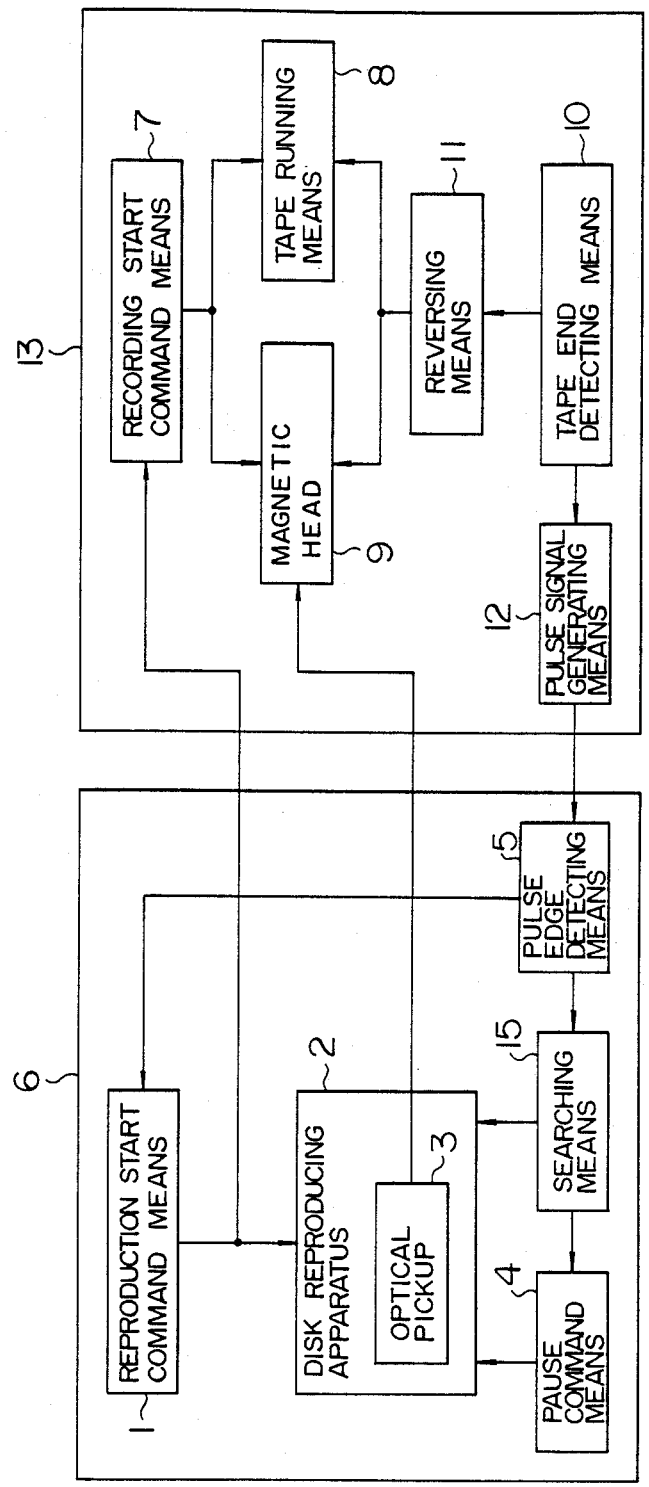
FIG. 1 is a block diagram of an information reproducing and recording system according to an embodiment of the invention.

In FIG. 1, reference numeral 1 denotes a reproduction start command means for outputting a reproduction start command to the disk reproducing apparatus 2;

3 denotes an optical pickup to read out the information recorded on a disk; 4 is pause command means for outputting a pause command to stop the movement of the optical pickup 3 of the disc reproducing apparatus 2 and to temporarily stop the reproducing operation; 15 is searching means for making the optical pickup 3 have access to an arbitrary recording position on the disk; 5 is a pulse-edge detecting means for receiving a pulse signal from a recording apparatus such as a cassette tape recorder or the like, which will be explained hereinlater, for detecting the leading and fall edges of the pulse signal, and for outputting an operation signal to the reproduction start command means 1 and searching means 15. The reproduction start command means 1, disk reproducing apparatus 2, optical pickup 3, pause command means 4, searching means 15, and pulse-edge detecting means 5 are provided in an optical disk reproducing apparatus 6 such as a compact disk player or the like.

Numeral 7 denotes recording start command means for receiving an output of the reproduction start command means 1 and outputting a recording start command to tape running means 8 for running or rotating a recording medium such as tape, magnetic disk, or the like and to recording means 9 such as a magnetic head or the like. Numeral 10 denotes tape end detecting means for detecting that the magnetic head is located at the end of the tape. For example, a sensor such as a reflection type photocoupler or the like can be used as the tape end detecting means 10. Numeral 11 denotes reversing means for receiving an output of the tape end detecting means 10, for restarting the recording operations of the tape running means 8 and magnetic head 9, and for reversing the running direction of the tape running means 8 and the magnetic head 9. Numeral 12 denotes pulse signal generating means for receiving the output of the tape end detecting means 10, for sending a falling pulse signal to the edge detecting means 5, and for further sending a leading pulse signal to the edge detecting means 5 after an elapse of a predetermined period of time. The recording start command means 7, tape running means 8, magnetic head 9, tape end detecting means 10, reversing means 11, and pulse signal generating means 12 are provided in a recording apparatus 13.

Figure 2:
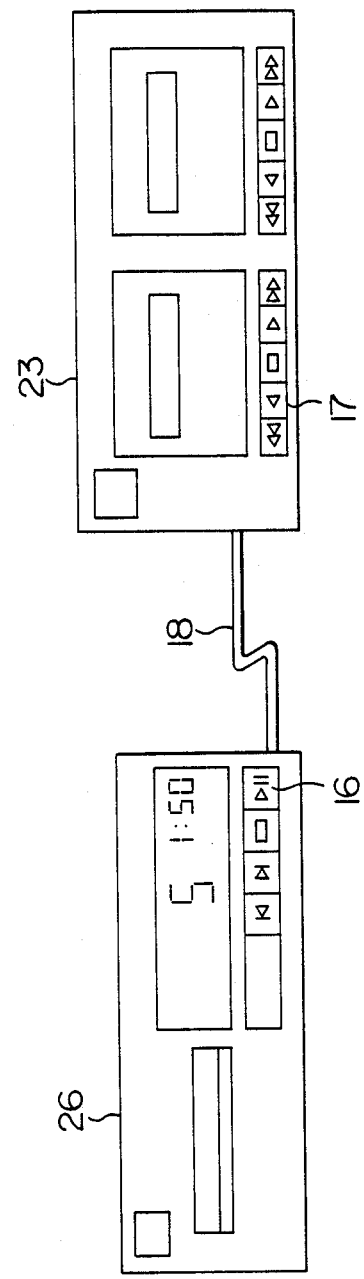
FIG. 2 is a front view of an embodiment of the invention using a CD player and a double cassette tape recorder.

FIG. 2 is a front view of a CD player 26 which is an example of the optical disk reproducing apparatus 6, and a double cassette tape recorder 23 which is an example of the recording apparatus 13. The reproduction start command means 1 and pause command means 4 can be operated by a single operation button 16. Namely, when the disk reproducing apparatus 2 is not in the reproducing mode, if the operation button 16 is depressed, the reproduction start command means 1 is made operative. When the disk reproducing apparatus 2 is actuated into the reproducing mode, if the operation button 16 is depressed, the pause command means 4 is made operative. The recording start command means 7 can be operated by an operation button 17. The CD player 26 and the double cassette tape recorder 23 are connected by a cable 18 to transfer the reproduction start command, reproduction information, and pulse signals.

The operation of the embodiment of the invention constituted as described above will be described hereinbelow.

Figure 3:
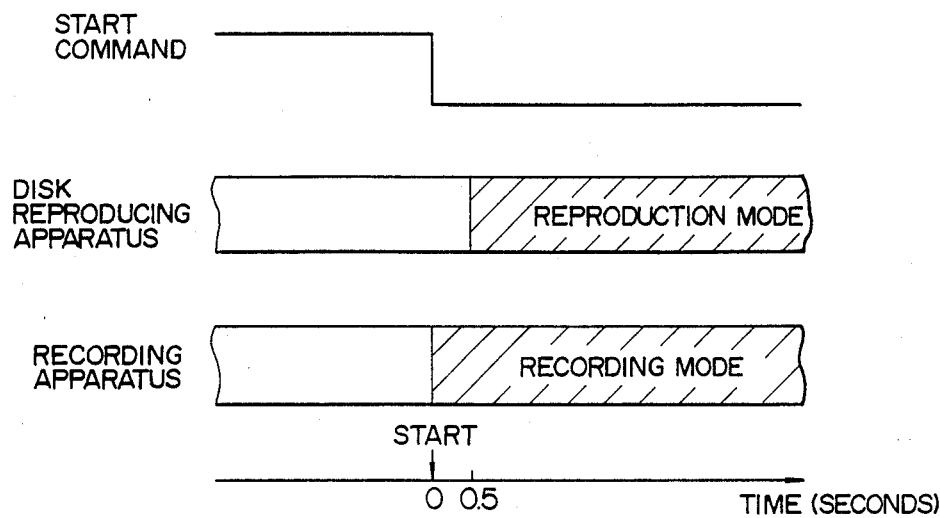
FIGS. 3 and 4 are timing charts for explaining the operation of this apparatus.
Figure 4:
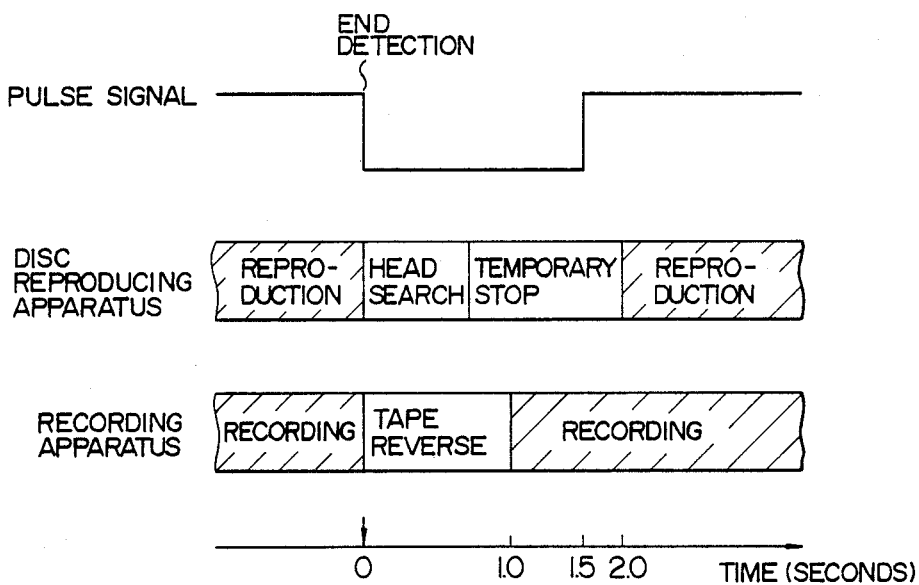
Figure 5:
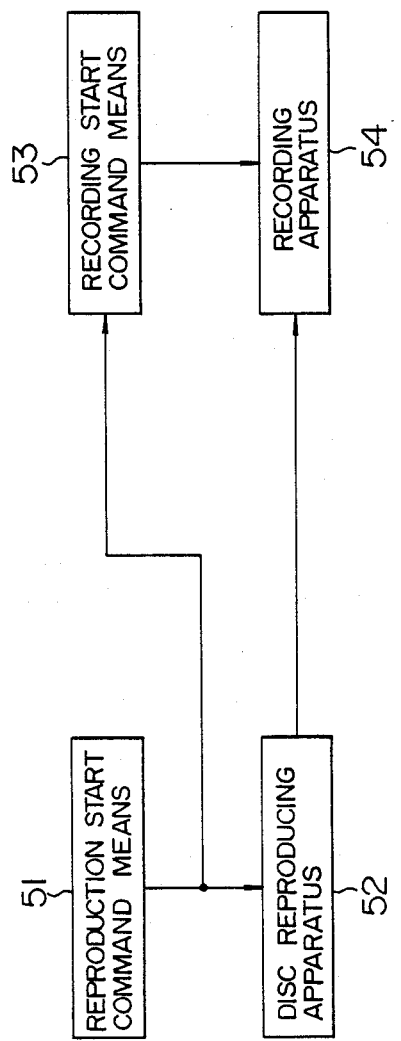
FIG. 5 is a block diagram of a conventional system.

First, a disk on which information composed of a plurality of information sections (e.g., music sections or the like and referred to as "segments" hereinbelow) is recorded is set into the optical disk reproducing apparatus 6. A tape is set into the recording apparatus 13. Then, by operating the reproduction start command means 1, as shown in FIG. 3, a start command is generated from the reproduction start command means 1 to the disk reproducing apparatus 2 and recording start command means 7. After an elapse of about 0.4 to 0.5 second after the disk reproducing apparatus 2 had received the start command, the optical pickup 3 starts to read the information recorded on the disk, thereby reproducing the information on the disk. When the recording start command means 7 receives the start command, it simultaneously outputs a recording start command to the tape running means 8 and to the magnetic head 9. Therefore, the recording onto the tape is started earlier than the information reading operation effected by the optical pickup 3. The information on the disk which was reproduced by the optical pickup 3 of the disk reproducing apparatus 2 can be recorded from the beginning of that information by the magnetic head 9 onto the tape which is run by the tape running means 8. The residual amount of tape decreases in association with the execution of the recording operation by the recording apparatus 13. When the tape has reached the end, as shown in FIG. 4, the tape end detecting means 10 detects the end of the recordable portion of the tape and outputs an end detection signal to the reversing means 11 and the pulse signal generating means 12. In response to the end detection signal from the tape end detecting means 10, the pulse signal generating means 12 outputs a falling pulse signal to the edge detecting means 5.

In response to the leading pulse signal from the edge detecting means 5, the searching means 15 stops or interrupts the reproducing operation of the disk reproducing apparatus 2 and performs the searching operation causing the optical pickup 3 to move from the reproducing position of the information segment (music or the like) which is being reproduced at that time to the header signal of the same information segment (i.e. at the head or beginning of the music segment). After completion of the searching operation, a pause command is subsequently outputted from the pause command means 4, so that the operation of the disk reproducing apparatus 2 is temporarily stopped.

Specifically the searching operation is effected as follows. Generally a CD disk has absolute addresses numbered at each recording position and starting from the head position of a first music segment stored in the disk and yet has a TOC (table of contents) area in an innermost peripheral portion storing for easy seach index information such as address numbers of the header positions of the stored musics, total recording or reproducing time period for the music segments, etc. Thus, with the CD disk set on the CD player, the player initially reads out the information of the TOC area to store the information per each music segment into its memory and then utilizes the information stored in the memory to promptly access to any desired music segment. Accordingly, in order that the searching means 15 searches the header signal position of a music segment at which the player reproducing operation is interrupted in response to the tape end detecting signal supplied from the tape recorder, the searching means 15 causes the optical pickup 3 to read the absolute address of the reproducing-operation interrupting position and has a microcomputer for comparing the read address with the information stored in the memory and calculating to identify at which music segment the compared address has been read. By further calculating out the difference between the header position information of the identified music stored in the memory and the address of the current position of the optical pickup means on the disk, the searching means 15 operates to shift the optical pickup means to the header position of the identified music.

As mentioned above, when the tape has reached the end while the recording apparatus 13 was recording the information reproduced by the optical disk reproducing apparatus 6, the disk reproducing apparatus 2 returns the optical pickup 3 by the search to the head of the information segment on the disk which was being reproduced at that time. Thereafter, the disk reproducing apparatus 2 is brought into the temporarily stopped state.

On the other hand, when the reversing means 11 receives the end detection signal from the tape end detecting means 10, the reversing means 11 reverses the magnetic head 9 and also allows the tape running means 8 to run in the opposite direction. A time of about hundreds of milliseconds to one second is needed to reverse the magnetic head 9 and to run the tape running means 8 in the opposite direction. Therefore, after an elapse of a time longer than this time, for example, after an expiration of 1.5 seconds after the pulse signal generating means 12 had received the end detection signal from the tape end detecting means 10, the pulse signal generating means 12 outputs a leading pulse signal to the edge detecting means 5. The searching operation of the disk reproducing apparatus 6 can be also sufficiently performed for 1.5 seconds. In response to the leading pulse signal from the pulse signal generating means 12, the edge detecting means 5 instructs the generation of a start command from the reproduction start command means 1 in order to reset the disk reproducing apparatus 2 which is in the temporary stop state into the reproducing mode. In response to the start command from the reproduction start command means 1, the disk reproducing apparatus 2 is set into the reproducing mode 0.4 to 0.5 second after the generation of the leading pulse signal. Although the start command generated from the reproduction start command means 1 is also outputted to the recording start command means 7, since the magnetic head 9 of the recording apparatus 13 and the tape running means 8 have already set in the recording mode, the recording apparatus 13 ignores the start command at this time.

After the recording apparatus 13 is set into the recording mode since the magnetic head 9 had been reversed and the tape running means 8 had run in the opposite direction, the disk reproducing apparatus 2 is reset into the reproducing mode and the same information segment as the information interrupted segment on the disk is subsequently recorded again onto the tape from the beginning of the segment.

As described above, according to the embodiment, after the recording apparatus 13 is set into the recording mode, the disk reproducing apparatus 2 is set into the reproducing mode; therefore the information recorded on the disk can be recorded from the beginning onto the tape. When the tape has reached the end while the disk reproducing apparatus 2 is reproducing the information on the disk, the tape end is detected by the tape end detecting means 10. The disk reproducing apparatus 2 immediately searches for the header signal of the reproduced information segment whose recording was interrupted and returns the pickup there and thereafter, they are temporarily stopped. Then, after the magnetic head 9 of the recording apparatus and the tape running means are reversed, the disk reproducing apparatus 2 is reset into the reproducing mode. Therefore, even if the recording is interrupted because the tape had reached the end in the midway of the information segment, the interrupted information segment can be again recorded from the beginning thereof after the tape running means is reversed. Even if the tape has reached the end during the recording operation, the information recorded on the disk can be all recorded onto the tape without lack of information.

In particular, when using a disk on which a plurality of music segments are recorded, even if the tape which is being recorded by the recording apparatus 13 has reached the end while the disk reproducing apparatus 2 is reproducing one music segment, after the magnetic head 9 and the tape running means 8 are reversed, the music segment which was being reproduced can be again reproduced from the beginning and can be recorded onto the reversed tape. Therefore, the music can be heard without losing the continuous image of the music when the tape is reproduced.

As will be obvious from the foregoing embodiment, an information reproducing and recording system of the present invention comprises: a disk reproducing apparatus for reproducing information composed of a plurality of information segments recorded on a disk, a recording apparatus for recording the information reproduced by the disk reproducing apparatus onto a recording medium; operation start command means for starting the operations of the disk reproducing apparatus and recording apparatus synchronously with each other; detecting means for detecting that the recording medium of the recording apparatus has reached the end; searching means for receiving an output of the detecting means, for interrupting the reproduction of the disk reproducing apparatus, and for searching for the header of an information segment which was interrupted at this time; pause command means for temporarily stopping the disk reproducing apparatus in response to the completion of the header search of the information segment by the searching means; and reversing means for receiving the output of the detecting means and reversing the recording medium, wherein after the reversing means reversed the recording medium, the temporary stop state of the disk reproducing apparatus is released. Therefore, it is possible to provide an extremely excellent information reproducing and recording system in which the information on the disk is reproduced by the disk reproducing apparatus and can be recorded onto the recording medium by the recording apparatus without lack of the information and after the tape running direction is reversed, the information segment the recording of which was interrupted at the tape end can be again recorded from the beginning of the information segment.

What is claimed is:

1. An information reproducing and recording system comprising:
   a disk reproducing apparatus for reproducing information from a plurality of information sections on a disk;
   a recording apparatus for recording the information reproduced by the disk reproducing apparatus onto a recording medium, said recording medium having an end;

operation start command means for starting the operations of the disk reproducing apparatus and recording apparatus synchronously with each other;

detecting means for detecting that the recording medium of said recording apparatus has reached said end;

searching means, responsive to the detecting output of said detecting means, for interrupting the reproducing operation of said disk reproducing apparatus and searching for a header signal of an information section, the reproduction of which has been interrupted;

pause command means for temporarily stopping said disk reproducing apparatus in response to the completion of the header signal search of said searching means;

reversing means for receiving the output of said detecting means and reversing the driving direction of the recording medium; and, means for releasing the temporary stop state of said reproducing apparatus after the reversing means reverses the driving direction of the recording medium.

2. An information reproducing and recording system comprising:

a CD player for reproducing information of a plurality of information sections of an optical disk;

a tape recorder for recording by a magnetic head information reproduced by said CD player onto a magnetic tape having a longitudinal end;

operation start command means for starting the operations of said CD player and said tape recorder synchronously with each other;

detecting means for detecting that the magnetic tape of said tape recorder has reached said end;

searching means, responsive to the detecting output of said detecting means, for interrupting the reproducing operation of said CD player, detecting a header signal position of an information section, the reproduction of which has been interrupted, and moving an optical pickup of said CD player to the detected header signal position;

pause command means for temporarily stopping said CD player in response to completion of the header signal search of said searching means;

reversing means for receiving the output of said detecting means and reversing the driving direction of the magnetic tape; and, means for releasing the temporary stop state of said CD player after said reversing means reverses the driving direction of the magnetic tape.

3. A system according to claim 2, wherein said optical disk has a plurality of music segments divisionally recorded thereon.

* * * * *